No. 648,303. Patented Apr. 24, 1900.
E. C. ROBERTS.
MUSIC BOX ATTACHMENT FOR BICYCLES.
(Application filed Sept. 28, 1899.)
(No Model.)
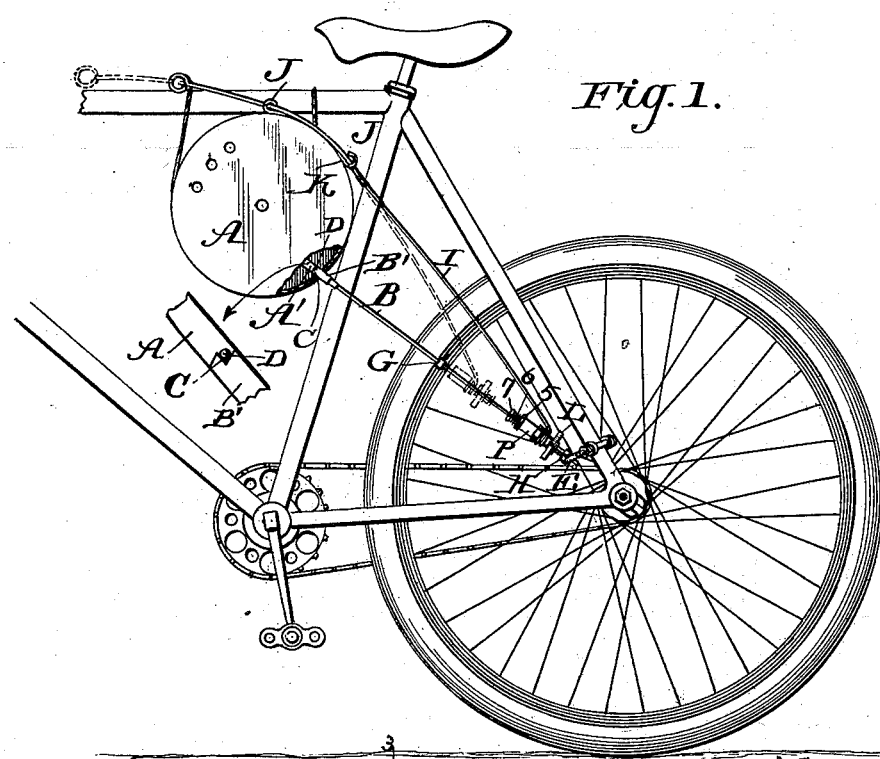
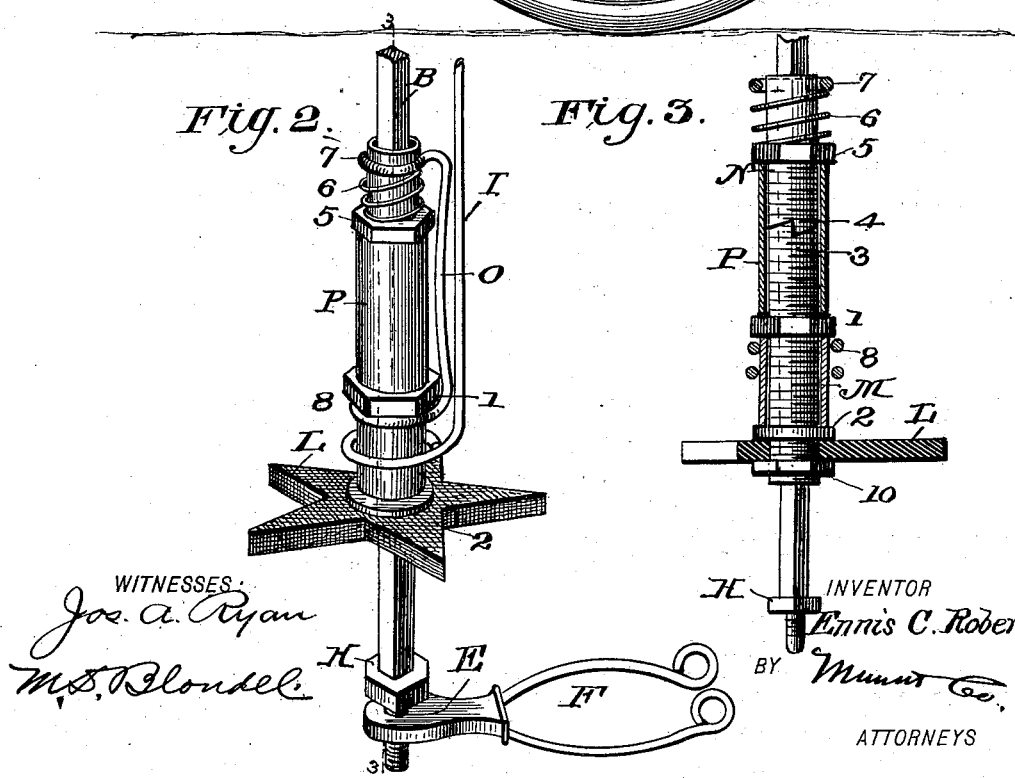
WITNESSES:
Jos. A. Ryan
M. S. Blondel
INVENTOR
Ennis C. Roberts
BY Munn & Co.
ATTORNEYS

UNITED STATES PATENT OFFICE.

ENNIS C. ROBERTS, OF PHŒNIX, ARIZONA TERRITORY.

MUSIC-BOX ATTACHMENT FOR BICYCLES.

SPECIFICATION forming part of Letters Patent No. 648,303, dated April 24, 1900.

Application filed September 28, 1899. Serial No. 731,951. (No model.)

*To all whom it may concern:*

Be it known that I, ENNIS C. ROBERTS, residing at Phœnix, in the county of Maricopa and Territory of Arizona, have invented a new and useful Improvement in Music-Box Attachments for Bicycles, of which the following is a specification.

My invention is an improvement in music-box attachments for bicycles, and has for an object to provide a simple novel construction by which a music-box may be operated from a wheel of a bicycle or similar vehicle; and the invention consists in certain novel constructions and combinations of parts, as will hereinafter be described, and pointed out in the claims.

In the drawings, Figure 1 is a side view of a part of a bicycle provided with my invention with the armed operating-wheel in position for operation by the wheel in full lines and in dotted lines adjusted to position where it will not be operated by the turning of the wheel. Fig. 2 illustrates different parts of the improvement in perspective, and Fig. 3 is a detail section on about line 3 3 of Fig. 2.

The music-box A may be of any desired form, having a stub-shaft A', which may be engaged by the main shaft B for operating the music-box when the main shaft B is turned. The shaft B is arranged at its upper end to engage the stub-shaft A', being provided at such end with a socket B' to receive the stub-shaft A', such socket B' being formed with a shoulder C to engage a stud D on the shaft A', so the shaft B when turned in one direction will operate the music-box, but will slip back and will not operate the music-box when the shaft B is turned in the opposite direction, as will be understood from the drawings. The shaft B is preferably square in cross-section or of other suitable non-circular form, so the clutch-section, presently described in connection with the armed wheel, may slide longitudinally on the main shaft B, but cannot turn independently of such shaft.

At its upper end the shaft B is supported by its connection with the shaft A', and its lower end rests in a bearing E in a bracket F, whose arms are clamped to one of the rear braces of the bicycle, as shown in Fig. 1. The shaft B is provided with upper and lower shoulders G and H, between which the armed wheel and its connected parts operate. The shoulder G forms a stop to limit the upward movement of the armed wheel, while the shoulder H operates similarly to limit the lower movement of the armed wheel. It should be understood that such armed wheel when in its lower position is suitably adjusted for operation by the spokes of the wheel, being in such position opposite and engaged by the spokes at the crossing thereof. The armed wheel is moved longitudinally by the slide-rod I, which is engaged at its lower end with the armed wheel and is guided in the eyes J, formed at the end of the guide-rod K, which is secured to the music-box A. The eyes J are usually so arranged as to slightly deflect the slide-rod and so secure sufficient friction to hold the slide-rod and the armed wheel which it operates in any position to which they may be adjusted.

The star or armed wheel L may preferably be of rubber to avoid any noise or injury from its operation by the spokes of the wheel. This armed wheel may be of any desired shape and have any suitable number of arms, and it may be desirable to provide them in sets of wheels having different numbers of arms, so they may be interchanged in order to secure a proper or desired operation of the music-box, according to the speed of the bicycle. The armed wheel has a tubular hub M, which embraces the shaft B and may turn upon or move longitudinally along said shaft. The hub M has external shoulders 1 and 2 and is extended upward above the shoulder 1, with its extremity 3 formed into a ratchet, which coöperates with a ratchet 4 on a clutch-section N, which slides along but is keyed from turning on the shaft B. The section N has a shoulder 5, and a spring 6 operates between a ring 7 and said shoulder to press the clutch-section yieldingly into engagement with the ratchet on the end of the wheel-hub. The ring 7 is on the upper end of a brace-rod O, which extends downwardly outside the wheel-hub and clutch-section and has a ring 8 embracing the wheel-hub immediately below the upper shoulder 1 thereon. This rod O holds the parts properly together and furnishes a proper bearing for the spring which actuates the clutch-section.

A sleeve or tube P fits over the ratcheted ends of the clutch-section and hub and protects the same, as will be understood from Fig. 2.

Now in operation when the armed wheel, having the desired number of arms, is applied the slide-rod may be operated to adjust such wheel to the position shown in full lines, Fig. 1, where it will be opposite the crossed point of the spokes and in position for operation by the spokes as the bicycle moves. When it is not desired to operate the music-box, the armed wheel can be quickly adjusted to the position indicated in dotted lines, Fig. 1.

It will be noticed that if the bicycle be moved rearwardly it will not operate the music-box, the clutch-section, as well as the provision made at the meeting ends of the main shaft and the shaft A', preventing any injury to the music-box when the bicycle is turned backward.

A nut 10 secures the wheel L so it can be readily removed and replaced by others when desired.

Having thus described my invention, what I claim as new, and desire to secure by Letters Patent, is—

1. An attachment for bicycles comprising the main shaft, the music-box with which such shaft is operatively connected, a bracket adapted for connection with the bicycle-frame and having a bearing for the lower end of the main shaft, a star or armed wheel sliding on said shaft and turning freely thereon, a clutch-section keyed on said shaft and movable longitudinally with the armed wheel along the shaft, a slide-rod for shifting said wheel longitudinally and guide devices for said slide-rod substantially as set forth.

2. The combination substantially as described, of the non-circular main shaft, the star or armed wheel having its hub provided with a ratchet and movable longitudinally and rotarily on the main shaft, the clutch-section keyed on and movable longitudinally along the main shaft into engagement with the hub of the star-wheel, the spring for operating the clutch-section, and the brace-rod connecting the clutch-section and wheel-hub and furnishing a bearing for the clutch-operating spring, substantially as set forth.

3. The combination of the music-box, the bicycle supporting the same, the main shaft arranged to operate the music-box, and a star or armed wheel movable on the main shaft into and out of position for its operation by the engagement of the spokes of the bicycle-wheel with its arms substantially as set forth.

4. The improved apparatus herein described, comprising a music-box, having a stub-shaft, the main shaft arranged at one end for operative connection with the stub-shaft, a bracket for supporting the other end of the main shaft, such bracket being adapted for connection with the framing of a bicycle, and an armed wheel supported on the main shaft and adapted for operation by the spokes of the bicycle-wheel, substantially as set forth.

5. An attachment for bicycles comprising the music-box provided with eyes arranged out of line, the shaft connected with said music-box and provided with means slidable into and out of position for operation by the bicycle-wheel, and a rod for sliding said means, such rod being passed through the eyes of the music-box and being deflected thereby substantially as set forth.

ENNIS C. ROBERTS.

Witnesses:
JAS. D. McCORMICK,
EUGENE M. WESCOTT.